US011991470B2

(12) United States Patent
Wang et al.

(10) Patent No.: US 11,991,470 B2
(45) Date of Patent: May 21, 2024

(54) SIMULATED PHOTOGRAPHING SPECIAL EFFECT GENERATION METHOD AND APPARATUS, DEVICE, AND MEDIUM

(71) Applicant: BEIJING ZITIAO NETWORK TECHNOLOGY CO., LTD., Beijing (CN)

(72) Inventors: Yujia Wang, Beijing (CN); Lu Tao, Beijing (CN); Ruifeng Ma, Beijing (CN); Zijian Gong, Beijing (CN); Chenxiang Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/337,761

(22) Filed: Jun. 20, 2023

(65) Prior Publication Data
US 2023/0336680 A1    Oct. 19, 2023

Related U.S. Application Data

(63) Continuation of application No. PCT/CN2021/132679, filed on Nov. 24, 2021.

(51) Int. Cl.
*H04N 5/262*     (2006.01)
(52) U.S. Cl.
CPC ................. *H04N 5/2621* (2013.01)
(58) Field of Classification Search
CPC .................................................. H04N 5/2621
See application file for complete search history.

(56) References Cited

U.S. PATENT DOCUMENTS

2020/0135235 A1    4/2020    Pena et al.
2022/0124258 A1*   4/2022    Pena ................... H04N 9/8042
2023/0319341 A1*  10/2023    Li ...................... H04N 21/4318
                                                             725/44

FOREIGN PATENT DOCUMENTS

CN    108711180 A    10/2018
CN    109035373 A    12/2018
(Continued)

OTHER PUBLICATIONS

"How to use Spark AR to create Instagram and Facebook filters: a tutorial for beginners." Brainlabs, Apr. 23, 2020, https://web.archive.org/web/20200921092504/https://www.brainlabsdigital.com/blog/how-to-use-spark-ar-to-create-instagram-and-facebook-filters-a-tutorial-for-beginners/. (Year: 2020).*
(Continued)

Primary Examiner — Antoinette T Spinks
(74) Attorney, Agent, or Firm — HSML P.C.

(57) ABSTRACT

A simulated photographing special effect generation method is provided, comprising: in response to a setting operation of a user on a special effect behavior event, adding a photographing behavior event; in response to a setting operation of the user on an image element associated with the photographing behavior event, determining an image element before photographing and/or an image element after photographing associated with the photographing behavior event; in response to a setting operation of the user on a trigger condition of the photographing behavior event, determining a trigger condition associated with the photographing behavior event; and storing the image element before photographing, the image element after photographing, and the photographing trigger condition which are associated with the photographing behavior event in association in a special effect configuration file.

19 Claims, 12 Drawing Sheets

(56) References Cited

FOREIGN PATENT DOCUMENTS

| | | |
|---|---|---|
| CN | 109697060 A | 4/2019 |
| CN | 110147231 A | 8/2019 |
| CN | 110704043 A | 1/2020 |
| CN | 111488186 A | 8/2020 |
| CN | 112637518 A | 4/2021 |
| JP | 2006072045 A | 3/2006 |

OTHER PUBLICATIONS

International Search Report (with English translation) and Written Opinion issued in PCT/CN2021/132679, dated Feb. 15, 2022, 15 pages provided.
The extended European search report issued in Application No. 21909000.8, issued Apr. 2, 2024.

* cited by examiner

SIMULATED PHOTOGRAPHING SPECIAL EFFECT GENERATION METHOD AND APPARATUS, DEVICE, AND MEDIUM

This application is a continuation application of International Application No. PCT/CN2021/132679, filed on Nov. 24, 2021, which claims the priority to Chinese patent application No. 202011522506.0, titled "METHOD AND APPARATUS FOR GENERATING SIMULATED PHOTOGRAPHING SPECIAL EFFECT, DEVICE AND MEDIUM", filed on Dec. 21, 2020, both of which are incorporated herein by reference in their entireties.

FIELD

The present disclosure relates to the field of video technology, and in particular to a method and an apparatus for generating a simulated photographing special effect, a device and a medium.

BACKGROUND

At present, video applications often process video contents with special effects, to meet user demands. There are usually two ways to develop special effects. In a first way, developers develop special effect packages by coding. However, the development efficiency is low since each special effect package is required to be developed separately. In a second way, an application for generating special effects is used, on which special effect packages are developed through interface operation. However, the application for generating special effects generally has relatively simple function and generates limited types of special effects, which cannot meet user demand for diversified special effects.

SUMMARY

In order to solve the above technical problems or at least partially solve the above technical problems, a method and an apparatus for generating a simulated photographing special effect, a device and a medium are provided according to the present disclosure.

A method for generating a simulated photographing special effect is provided according to an embodiment of the present disclosure. The method includes:
  adding a photographing behavior event in response to a user operation for setting a special effect behavior event;
  determining a prior-photographing image element and/or a post-photographing image element associated with the photographing behavior event in response to a user operation for setting image elements associated with the photographing behavior event;
  determining a trigger condition associated with the photographing behavior event in response to a user operation for setting the trigger condition of the photographing behavior event; and
  storing the prior-photographing image element, the post-photographing image element and the trigger condition associated with the photographing behavior event in association in a special effect configuration file.

The special effect configuration file is used in special effect configuration for an original video image during video capturing, so that in the video capturing, a target video image for the output of the video capturing is generated based on the original video image and the prior-photographing image element before the trigger condition of the photographing behavior event is met, and/or the target video image for the output of the video capturing is generated based on a freeze-frame image and the post-photographing image element after the trigger condition of the photographing behavior event is met. The freeze-frame image includes an original video image captured at the instant when the trigger condition of the photographing behavior event is met in the video capturing.

In some embodiments, the prior-photographing image element includes a first image element and a second image element, the post-photographing image element does not include the first image element, and the post-photographing image element includes the second image element.

In some embodiments, the post-photographing image element further includes a third image element.

In some embodiments, the method further includes:
  setting an image rendering chain corresponding to the photographing behavior event in response to a user operation for setting rendering levels of the photographing behavior event, and storing the image rendering chain in association with the prior-photographing image element, the post-photographing image element and the trigger condition in the special effect configuration file.

The special effect configuration file is further used to determine rendering levels of the prior-photographing image element, the post-photographing image element and the freeze-frame image based on the image rendering chain.

In some embodiments, the determining the post-photographing image element associated with the photographing behavior event in response to the user operation for setting the image elements associated with the photographing behavior event includes:
  determining a fourth image element associated with the photographing behavior event in response to the user operation for setting the image elements associated with the photographing behavior event; and
  determining the post-photographing image element based on the fourth image element and the image element to be rendered after the preset rendering level on the image rendering chain.

The post-photographing image element belongs to both the fourth image element and the image element to be rendered after the preset rendering level on the image rendering chain.

In some embodiments, the method further includes:
  setting multiple photographing points of the photographing behavior event in response to a user operation for setting a photographing action of the photographing behavior event, and storing the multiple photographing points in association with the prior-photographing image element, the post-photographing image element and the trigger condition in the special effect configuration file.

The special effect configuration file is further configured to acquire one freeze-frame image at each of the multiple photographing points, and display the acquired freeze-frame images after the photographing points.

In some embodiments, the method further includes:
  setting an image display mode of the photographing behavior event in response to a user operation for setting image display of the photographing behavior event, and storing the image display mode in association with the prior-photographing image element, the post-photographing image element and the trigger condition in the special effect configuration file.

The special effect configuration file is further used to display the freeze-frame image based on the display mode.

In some embodiments, the image display mode includes at least one of:
- a mode of formatting the freeze-frame image and then displaying the freeze-frame image;
- a mode of animating the freeze-frame image and then displaying the freeze-frame image; and
- a mode of displaying multiple freeze-frame images in sequence or in a combined manner in case of multiple freeze-frame images.

An apparatus for generating a simulated photographing special effect is further provided according to an embodiment of the present disclosure. The apparatus includes a behavior event addition module, an element setting module, a condition setting module and an association storing module.

The behavior event addition module is configured to add a photographing behavior event in response to a user operation for setting a special effect behavior event.

The element setting module is configured to determine a prior-photographing image element and/or a post-photographing image element associated with the photographing behavior event in response to a user operation for setting image elements associated with the photographing behavior event.

The condition setting module is configured to determine a trigger condition associated with the photographing behavior event in response to a user operation for setting the trigger condition of the photographing behavior event.

The association storing module is configured to store the prior-photographing image element, the post-photographing image element and the trigger condition associated with the photographing behavior event in association in a special effect configuration file.

The special effect configuration file is used in special effect configuration for an original video image during video capturing, so that in the video capturing, a target video image for the output of the video capturing is generated based on the original video image and the prior-photographing image element before the trigger condition of the photographing behavior event is met, and/or the target video image for the output of the video capturing is generated based on a freeze-frame image and the post-photographing image element after the trigger condition of the photographing behavior event is met. The freeze-frame image includes an original video image captured at the instant when the trigger condition of the photographing behavior event is met in the video capturing.

In some embodiments, the prior-photographing image element includes a first image element and a second image element, the post-photographing image element does not include the first image element, and the post-photographing image element includes the second image element.

The post-photographing image element further includes a third image element.

In some embodiments, the apparatus further includes a rendering level setting module.

The rendering level setting module is configured to set an image rendering chain corresponding to the photographing behavior event in response to a user operation for setting rendering levels of the photographing behavior event, and store the image rendering chain in association with the prior-photographing image element, the post-photographing image element and the trigger condition in the special effect configuration file.

The special effect configuration file is further used to determine rendering levels of the prior-photographing image element, the post-photographing image element and the freeze-frame image based on the image rendering chain.

In some embodiments, the element setting module is specifically configured to: determine a fourth image element associated with the photographing behavior event in response to the user operation for setting the image elements associated with the photographing behavior event; and
determine the post-photographing image element based on the fourth image element and the image element to be rendered after the preset rendering level on the image rendering chain.

The post-photographing image element belongs to both the fourth image element and the image element to be rendered after the freeze-frame image on the image rendering chain.

In some embodiments, the apparatus further includes a photographing point setting module.

The photographing point setting module is configured to set multiple photographing points of the photographing behavior event in response to a user operation for setting a photographing action of the photographing behavior event, and store the multiple photographing points in association with the prior-photographing image element, the post-photographing image element and the trigger condition in the special effect configuration file.

The special effect configuration file is further configured to acquire one freeze-frame image at each of the multiple photographing points, and display the acquired freeze-frame images after the photographing points.

In some embodiments, the apparatus further includes a display mode setting module.

The display mode setting module is configured to set an image display mode of the photographing behavior event in response to a user operation for setting image display of the photographing behavior event, and store the image display mode in association with the prior-photographing image element, the post-photographing image element and the trigger condition in the special effect configuration file.

The special effect configuration file is further configured to display the freeze-frame image based on the display mode.

In some embodiments, the image display mode includes at least one of:
- a mode of formatting the freeze-frame image and then displaying the freeze-frame image;
- a mode of animating the freeze-frame image and then displaying the freeze-frame image; and
- a mode of displaying multiple freeze-frame images in sequence or in a combined manner in case of multiple freeze-frame images.

An electronic device is further provided according to an embodiment of the present disclosure. The electronic device includes: a processor; and a memory configured to store processor-executable instructions. The processor is configured to read the executable instructions from the memory and execute the instructions to implement the method for generating the simulated photographing special effect according to the embodiments of the present disclosure.

A computer readable storage medium storing a computer program is further provided according to an embodiment of the present disclosure. The computer program is configured to implement the method for generating the simulated photographing special effect according to the embodiments of the present disclosure.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings can be obtained according to the provided drawings without any creative effort.

DETAILED DESCRIPTION OF EMBODIMENTS

Figure 1:
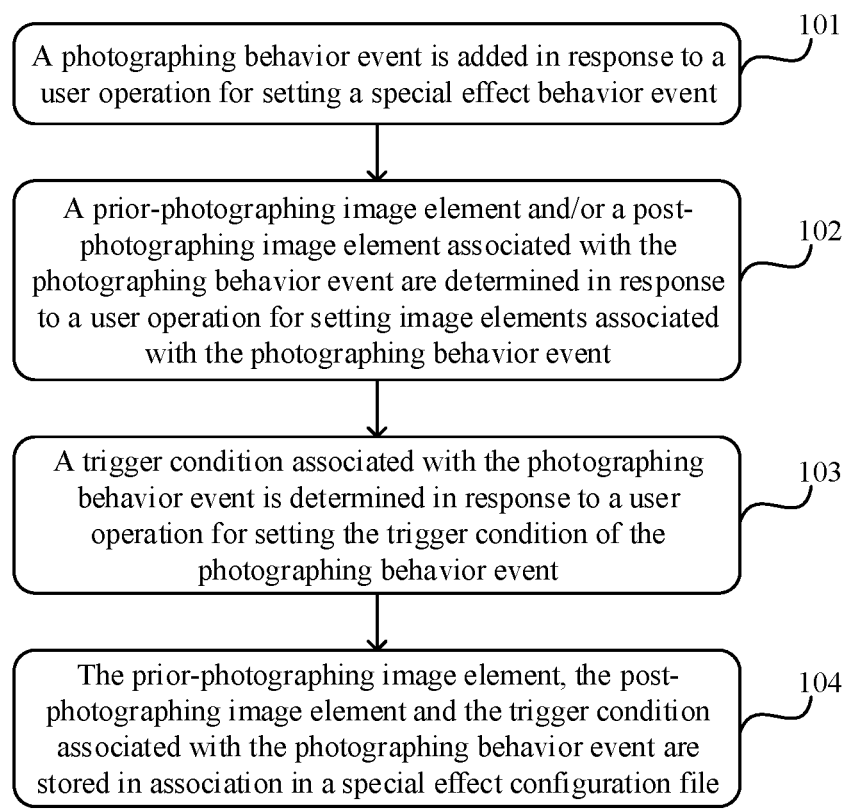
FIG. 1 is a schematic flowchart of a method for generating a simulated photographing special effect according to an embodiment of the present disclosure.

In order to understand the above objects, features and advantages of the present disclosure more clearly, the solutions of the present disclosure are further described hereinafter. It should be noted that the embodiments of the present disclosure and the features in the embodiments can be combined with each other if there is no conflict.

In the following description, numerous specific details are set forth in order to provide thorough understanding of the present disclosure. However, the present disclosure may be implemented in other ways different from those described here. Obviously, the embodiments in the specification are only a part of the embodiments of the present disclosure, rather than all the embodiments.

For the defects that the convention application for generating special effects generally has relatively simple function and generates limited types of special effects, failing to meet user demand for diversified special effects, a method for generating a simulated photographing special effect is provided according to an embodiment of the present disclosure. The method may be applied to an application for generating special effects. By adding corresponding functions to the application for generating special effects, a special effect creator may conveniently and quickly make a simulated photographing special effect with the application for generating special effects. The simulated photographing special effect, as a type of special effect, can create a photographing behavior event in response to a setting user operation, determine a prior-photographing image element and/or a post-photographing image element associated with the photographing behavior event, and determine a trigger condition associated with the photographing behavior event. With the present technical solution, the user may select image elements required by the special effect on the application for generating special effects, adjust a display logic relationship among the image elements and take the display logic relationship into effect through the application for generating special effects. Therefore, it is convenient to make simulated photographing special effects including different image elements, to meet the requirements of different application scenarios. At the same time, the prior-photographing image element, the post-photographing image element and the trigger condition configured in the application for generating special effects may be stored in association in a special effect configuration file, and the special effect configuration file may be distributed to a video application for usage in the video application.

By executing the above special effect configuration file on the video application, special effect configuration may be performed on an original video image in video capturing, so that during the video capturing, a target video image for the output of the video capturing is generated based on the original video image and the prior-photographing image element before the trigger condition of the photographing behavior event is met, and/or a target video image for the output of the video capturing is generated based on a freeze-frame image and the post-photographing image element after the trigger condition of the photographing behavior event is met. The freeze-frame image includes an original video image captured at the instant when the trigger condition of the photographing behavior event is met in the video capturing.

FIG. 1 is a schematic flowchart of a method for generating a simulated photographing special effect according to an embodiment of the present disclosure. The method is applied to an application for generating special effects, which may be installed in an electronic device. The electronic device includes but not limited to a computer, a mobile phone and other devices. As shown in FIG. 1, the method includes the following steps 101 to 104.

In step 101, a photographing behavior event is added in response to a user operation for setting a special effect behavior event.

In an embodiment, in this step, a special effect configuration interface may be set in the application for generating special effects. The user may perform the setting operation on the special effect configuration interface to add the special effect behavior event, which is the photographing behavior event in this step.

In step 102, a prior-photographing image element and/or a post-photographing image element associated with the photographing behavior event are determined in response to a user operation for setting image elements associated with the photographing behavior event.

In an embodiment, in this step, the user may perform the setting operation on the special effect configuration interface to determine the prior-photographing image element and/or the post-photographing image element associated with the photographing behavior event. In an embodiment, through the setting operation, the prior-photographing image element and the post-photographing image element may be set as an independent display behavior event to display the image elements, or set as a sub-event in the photographing behavior event to display the image elements, which is not limited herein.

In step 103, a trigger condition associated with the photographing behavior event is determined in response to a user operation for setting the trigger condition of the photographing behavior event.

Similar to the steps 101 and 102, the user may perform the setting operation on the special effect configuration interface to determine the trigger condition associated with photographing behavior event. The trigger condition may include at least one of a notification trigger condition, a variable trigger condition, a time trigger condition or a behavior trigger condition, which is specifically introduced in the following embodiments.

In step 104, the prior-photographing image element, the post-photographing image element and the trigger condition associated with the photographing behavior event are stored in association in a special effect configuration file.

After the setting operations in steps 101 to 103, the contents set in the above steps may be stored in association to obtain the special effect configuration file for the simulated photographing special effect. The special effect configuration file may be generated by clicking a configuration file generation button on the application for generating special effects, and may be subsequently applied to the video application.

The special effect configuration file is used in special effect configuration for an original video image in video capturing, so that during the video capturing, a target video image for the output of the video capturing is generated based on the original video image and the prior-photographing image element before the trigger condition of the photographing behavior event is met, and/or a target video image for the output of the video capturing is generated based on a freeze-frame image and the post-photographing image element after the trigger condition of the photographing behavior event is met. The freeze-frame image includes an original video image captured at the instant when the trigger condition of the photographing behavior event is met in the video capturing.

In some embodiments, the prior-photographing image element may include two types of image elements, i.e., a first image element and a second image element. The first image element is only displayed before photographing, and will not be frozen and recorded together with the freeze-frame image at the time of photographing. Therefore, the first image element is not displayed after photographing, and thus the post-photographing image element does not include the first image element. The second image element is recorded together with the freeze-frame image at the time of photographing, and is displayed after photographing. Therefore, the post-photographing image element includes the second image element.

Further, in the above embodiment, the post-photographing image element may further include a third image element in addition to the second image element. The third image element may be other image elements except the first image element and the second image element, or an image element same as the second image element, and may be displayed with the freeze-frame image simultaneously, non-simultaneously or partially simultaneously.

Figure 2:
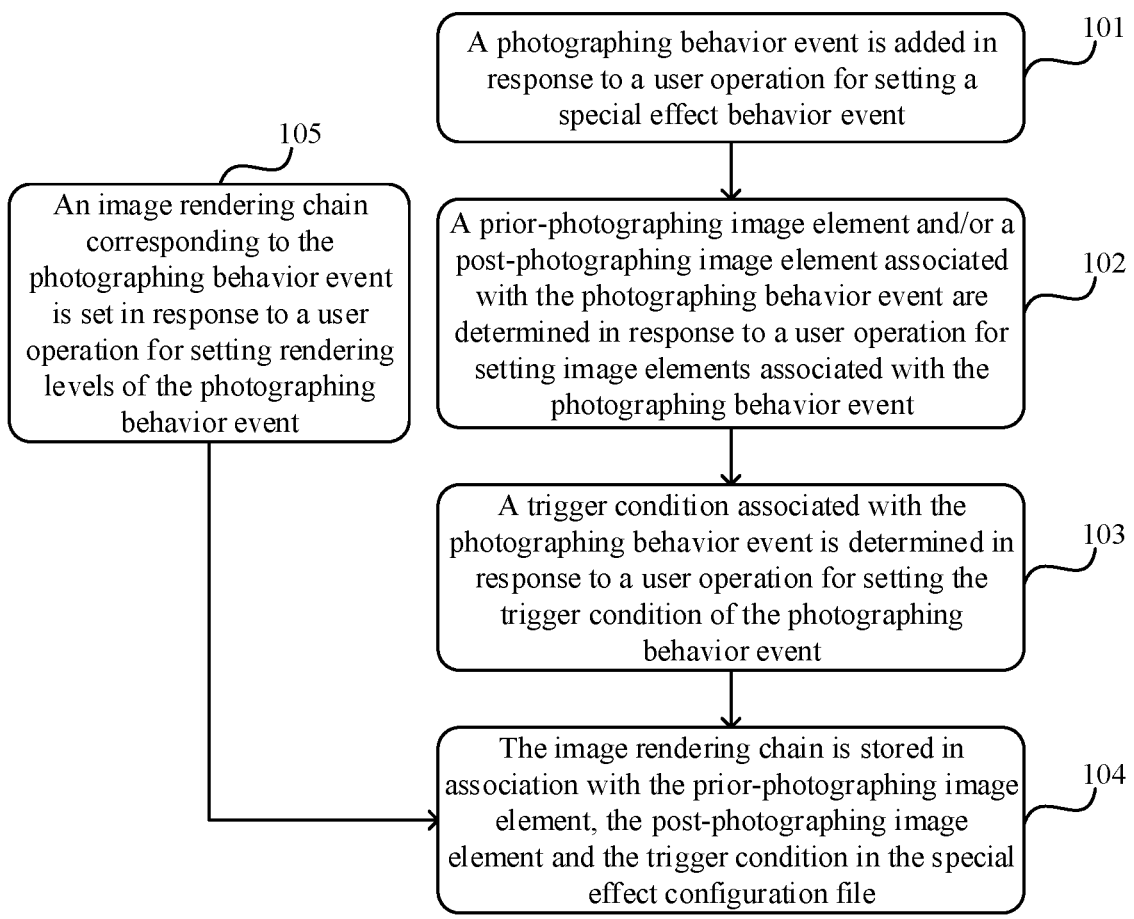
FIG. 2 is a schematic flowchart of a method for generating a simulated photographing special effect according to another embodiment of the present disclosure.

FIG. 2 is a schematic flowchart of a method for generating a simulated photographing special effect according to another embodiment of the present disclosure. As shown in FIG. 2, in addition to steps 101 to 104 shown in FIG. 1, the method further includes the following step 105.

In step 105, an image rendering chain corresponding to the photographing behavior event is set in response to a user operation for setting rendering levels of the photographing behavior event, and the image rendering chain is stored in association with the prior-photographing image element, the post-photographing image element and the trigger condition in the special effect configuration file.

The special effect configuration file is further used to determine rendering levels of the prior-photographing image element, the post-photographing image element and the freeze-frame image based on the image rendering chain during the video capturing.

In an embodiment, the image rendering chain may define a rendering level of each image element in each image frame in the captured video. Based on the image rendering chain, the prior-photographing image element, the post-photographing image element and the freeze-frame image may be rendered to obtain a video image finally displayed to the user. The execution order of step 105 may be set according to actual requirements, as long as it is executed before the association storage of step 104.

For example, in combination with display of the third image element in the above embodiment, a rendering level where the third image element is located may be set as being before a rendering level of the freeze-frame image, so that the third image element may be displayed in the video image. However, an image element having a rendering level after the rendering level of the freeze-frame image cannot be simultaneously displayed with the freeze-frame image in the video image.

Further, a rendering level where an image element frozen simultaneously with the freeze-frame image is located may also be defined by the image rendering chain. For example, the step 105 may specifically include:
  in response to the user operation for setting the rendering levels of the photographing behavior event, setting an image element to be rendered after a preset rendering level on the image rendering chain, where the image element to be rendered after the preset rendering level is an image element that is capable of being frozen simultaneously with the freeze-frame image but is not necessarily frozen, which is to be associated with the user operation for setting the image element associated with the photographing behavior event.

That is, the step 102 further includes determining a fourth image element associated with the photographing behavior event in response to the user operation for setting the image element associated with the photographing behavior event.

The post-photographing image element, for example, the image element frozen simultaneously with the freeze-frame image, may be determined based on the fourth image element and the image element to be rendered after the preset rendering level on the image rendering chain. The post-photographing image element belongs to both the fourth image element and the image element to be rendered after the preset rendering level on the image rendering chain.

In the embodiments shown in FIGS. 1 and 2 of the present disclosure, the setting operations may be implemented on the special effect configuration interface of the application for generating special effects. The special effect configuration interface may include a special effect design interface and an event interface. Some of the setting operations may be implemented on the special effect design interface, while others may be implemented on the event interface. For example, the setting operations in steps 101 to 103 are implemented on the event interface, while the setting operation in step 105 is implemented on the special effect design interface.

Figure 3:
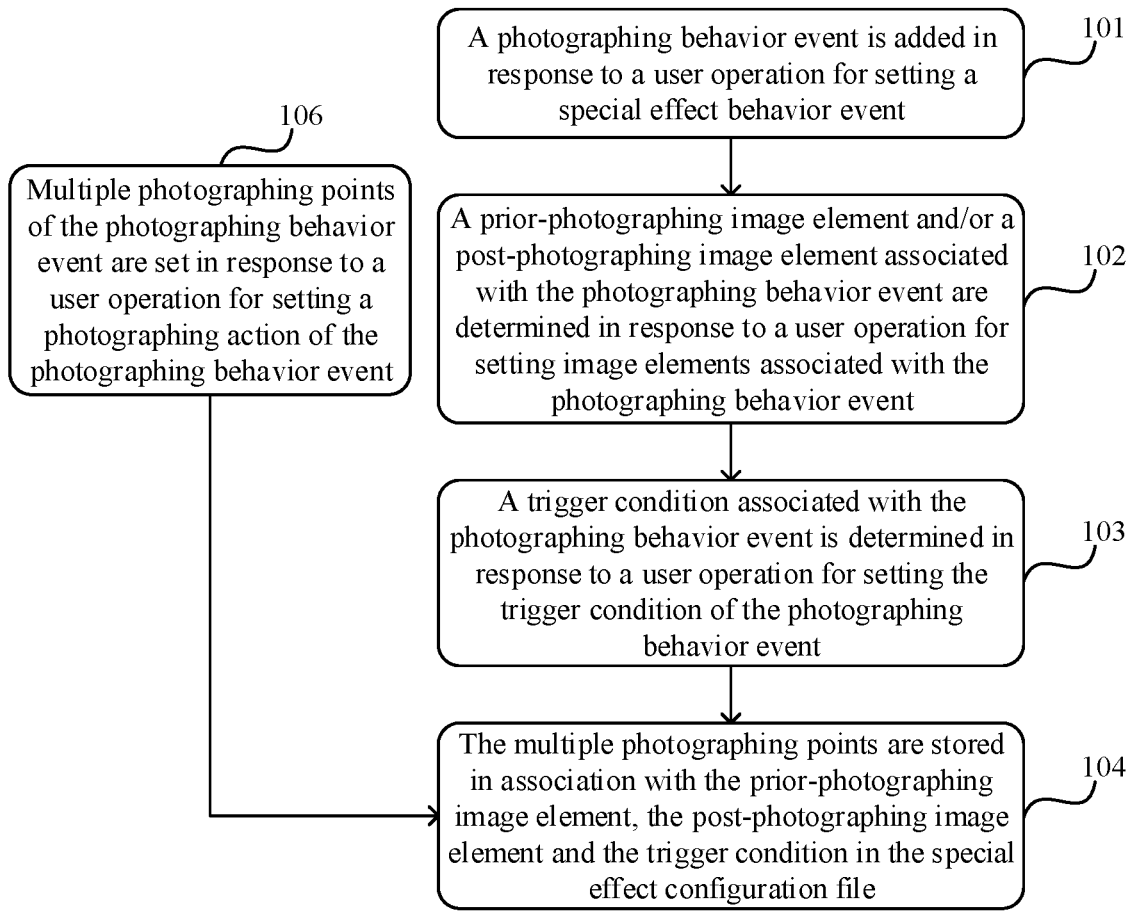
FIG. 3 is a schematic flowchart of a method for generating a simulated photographing special effect according to yet another embodiment of the present disclosure.

FIG. 3 is a schematic flowchart of a method for generating a simulated photographing special effect according to another embodiment of the present disclosure. As shown in FIG. 3, in addition to steps 101 to 104 shown in FIG. 1, the method further includes the following step 106.

In step 106, multiple photographing points of the photographing behavior event are set in response to a user operation for setting a photographing action of the photographing behavior event, and the multiple photographing points are stored in association with the prior-photographing image element, the post-photographing image element and the trigger condition in the special effect configuration file.

The special effect configuration file is further used to acquire a freeze-frame image at each of the multiple photographing points, and display the acquired freeze-frame images after the photographing points.

In the technical solution according to the embodiment, there may be multiple photographing points for acquiring multiple freeze-frame images, and then the freeze-frame images are displayed after the photographing points. In this way, multiple freeze-frame images may be photographed by multiple shootings, which further enriches the styles of special effects and meets user demands. Image element to be frozen simultaneously with each freeze-frame image may be set in a way as shown in the embodiment of FIG. 1. Each freeze-frame image may have the same or different prior-photographing image elements and the same or different post-photographing image elements by necessary setting operations. At the same time, with reference to the embodiments shown in FIG. 2, image elements frozen simultaneously with different frozen images may be the same or different.

Figure 4:
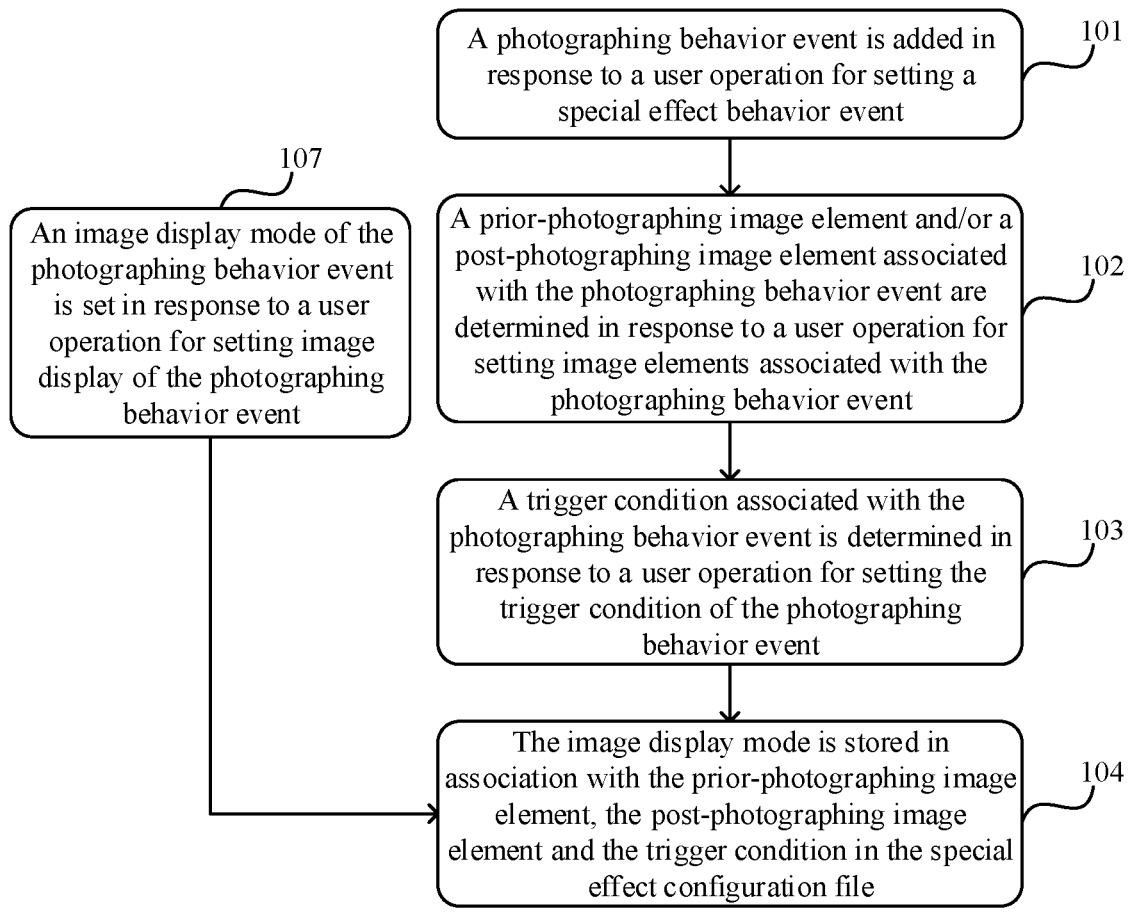
FIG. 4 is a schematic flowchart of a method for generating a simulated photographing special effect according to yet another embodiment of the present disclosure.

FIG. 4 is a schematic flowchart of a method for generating a simulated photographing special effect according to another embodiment of the present disclosure. As shown in FIG. 4, in addition to steps 101 to 104 shown in FIG. 1, the method further includes the following step 107.

In step 107, an image display mode of the photographing behavior event is set in response to a user operation for setting image display of the photographing behavior event, and the image display mode is stored in association with the prior-photographing image element, the post-photographing image element and the trigger condition in the special effect configuration file.

The special effect configuration file is further used to display the freeze-frame image based on the image display mode.

As described in the above embodiments, the technical solution according to the embodiments of the present disclosure may be implemented on an application for generating special effects, and specifically, the application for generating special effects may include a special effect configuration interface for interacting with the user, through which the user may perform special effect configuration, such as selecting an image element required by the special effect and creating a behavior event related to display of the image element. For details, reference may be made to the following two steps.

In step 1, a navigation tree is added on a special effect configuration interface in response to an user operation. The image elements and the rendering level of the freeze-frame image can be set on the navigation tree to form the image rendering chain corresponding to the photographing behavior event. In an embodiment, in order to clarify an image element that is frozen simultaneously with the freeze-frame image, such as the second image element, a photographing action may be added to the navigation tree, a rendering level corresponding to the photographing action on the image rendering chain is used as the preset rendering level, and an image element after the rendering level corresponding to the photographing action may be frozen together with the freeze-frame image. The freeze-frame image may also be set on the navigation tree. In this way, the image element before the rendering level of the freeze-frame image can be displayed when being displayed in time period same as the freeze-frame image, while the image element after the rendering level cannot be displayed simultaneously with the freeze-frame image.

In step 2, a photographing behavior event is added on the special effect configuration interface in response to an user operation. The photographing behavior event is mainly used to trigger the photographing action in a case that the trigger condition is met, to obtain the freeze-frame image. At the same time, the second image element is also frozen simultaneously.

Furthermore, the photographing behavior event may further be used to set a trigger condition associated with the photographing behavior event and set a prior-photographing image element and/or a post-photographing image element, in addition to triggering the photographing action. In some embodiments, if the functions of adding the image element and creating the behavior event are realized in steps 1 and 2 respectively, the special effect configuration interface may be designed according to the functions. That is, the special effect configuration interface includes a special effect design interface and an event interface, which are used to realize the functions in steps 1 and 2 respectively.

Figure 5:
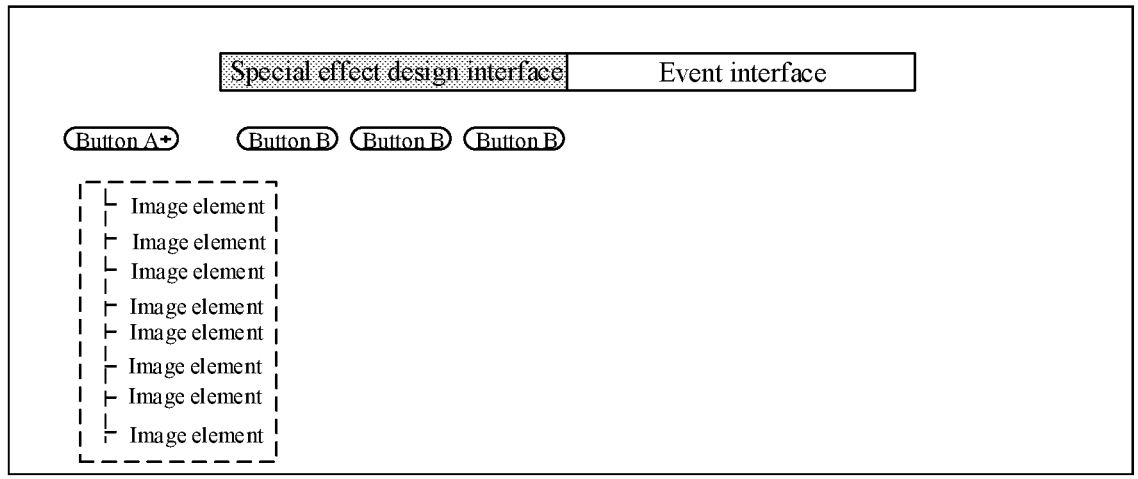
FIG. 5 is a schematic diagram of a special effect design interface according to an embodiment of the present disclosure.
Figure 6:
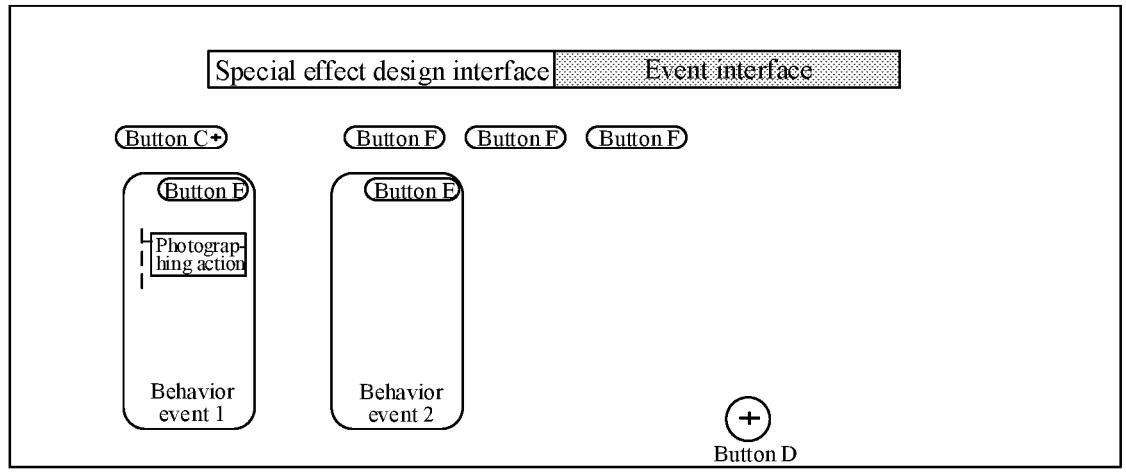
FIGS. 6 to 15 are schematic diagrams of event interfaces according to different embodiments of the present disclosure.

FIG. 5 is a schematic diagram of a special effect design interface according to an embodiment of the present disclosure. FIG. 6 is a schematic diagram of an event interface according to an embodiment of the present disclosure. The above two interfaces may be interfaces of the application for generating special effects, which may be switched by user triggering operation, for example, by a clicking.

In an embodiment, the step 1 may include:
displaying the special effect design interface, where the special effect design interface is provided with an image element addition button, through which various image elements required for generating a special effect may be added. At the same time, the added image elements may be set in the navigation tree.

In the embodiment of the present disclosure, a photographing action and a freeze-frame image are added to the navigation tree. In an embodiment, as shown in FIG. 5, there may be various forms for the image element addition button. For example, a list of image elements may be displayed by clicking a button A, and an image element may be selected from this list and added to the navigation tree. Alternatively, each image element is provided with a shortcut button, i.e., a button B, and a corresponding image element may be added to the navigation tree by clicking the shortcut button. The buttons A and B are examples, and buttons in other forms are also possible. In an embodiment, the navigation tree may further include a freeze-frame image and a photographing action corresponding to a photographing behavior event.

In an embodiment, the step 2 may include:
displaying the event interface, where the event interface is provided with a behavior event creation button, through which the user may create various behavior events. The sequence for displaying various image elements may be defined in the behavior events, so that various image elements may be displayed according to certain time order and logic. In addition, the execution time of the photographing action in the photographing behavior event and the trigger condition of the photographing behavior event may be set.

In response to the user operation for setting the special effect behavior event, the photographing behavior event is added by:
creating the photographing behavior event based on a control instruction of the user on the behavior event creation button, where the photographing behavior event includes a photographing action, so that a freeze-frame image may be generated from an original video image by triggering the photographing action.

In some embodiments, the photographing behavior event is a behavior event in which the photographing action is added. The photographing action is a sub-event of the photographing behavior event.

As shown in FIG. 6, a behavior event may be added by a behavior creation button, i.e., a button C. Alternatively, a behavior event may be added by another behavior creation button, i.e., a button D. In a behavior event added in any of the above ways or other ways, a specific function (such as a photographing action) included in the behavior event may be further added by an image element addition button, i.e., a button E, or another image element addition button, i.e., a button F. These functions may appear as a sub-event of the behavior event. That is, other sub-events may also be included. In a same behavior event, sub-events may be executed sequentially in a time order, or at least two sub-events may be set to be executed at the same time through some setting methods. In the embodiment, the event creation button may include one of the behavior creation button C and the creation button D. The Button E and the button F may be regarded as one sub-event creation button. That is, one specific behavior event may be created through the combination of two buttons. Of course, other setting methods are also possible. For example, the specific behavior event may be created through a single event creation button.

In addition, the image element addition button may be in the form of button E, which is set fixedly on an event interface. An image element is added to a behavior event through the button E, i.e., a sub-event is created. Alternatively, the image element addition button may be in the form of button F, which is set on a panel of a behavior event. By clicking the button F, a list for selecting image elements may be displayed, and image elements may be directly added from the list. Given different types of image elements, the image elements have different display modes in each behavior event. For example, for the photographing action, an original image may be captured, and image elements of a certain picture type may be displayed, but all of which correspond to a sub-event in the behavior event.

As described above, the display time of various image elements in the navigation tree may be defined in the behavior event. In the behavior event, the sub-events may be restricted to be executed sequentially or simultaneously. For different behavior events, there is usually no restriction on time sequence of execution; however, different behavior events can be set to be executed successively in a certain time sequence or executed simultaneously by setting the trigger conditions of the behavior events. For example, the specific time sequence may be set by "sending a notification" and "receiving the notification".

In the embodiment of the present disclosure, the button E and the button F may be used in creation of sub-events, thus being considered as sub-event creation buttons.

In some embodiments, a freeze-frame image may be collected by the photographing behavior event, and the freeze-frame image may be displayed in a simulated photographing special effect, or transferred to other containers or middleware for processing to acquire a corresponding effect. There are two ways of displaying in the simulated photographing special effect. The first way is to create a first display sub-event of displaying based on the freeze-frame image in the photographing behavior event. The second way is to directly create a photo display event using the behavior event creation button, and the photo display event is used to display the freeze-frame image.

Figure 7:
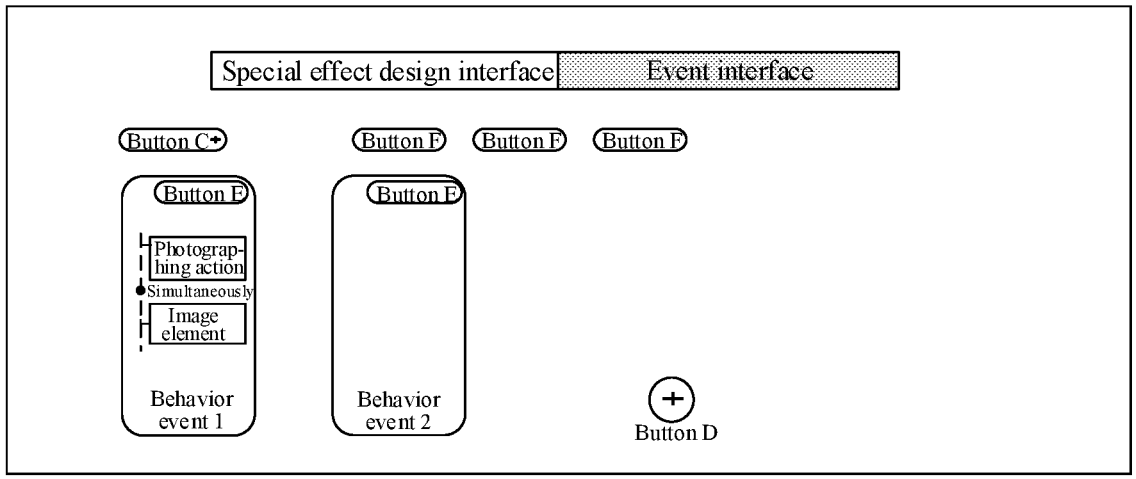

FIG. 7 shows the first way. A control instruction issued by a user through a sub-event creation button on the event interface, for example a control instruction issued through the button E, may be received, and a first display sub-event is created in the photographing behavior event based on the control instruction, i.e., the first display sub-event of displaying a freeze-frame image is added in the photographing behavior event, to display the freeze-frame image during the execution of the photographing behavior event. For the specific manner for adding the sub-event, reference may be made to the way of adding the photographing action to the photographing behavior event described above. The first display sub-event may be configured to occur at the same time as the photographing action is triggered, for example, a simultaneous marking point may be selected, i.e., the freeze-frame image may be displayed as soon as it is acquired. Alternatively, a time delay may be set between the photographing action and the display of the freeze-frame image, and the time delay may also be set as display time of other image elements.

Figure 8:
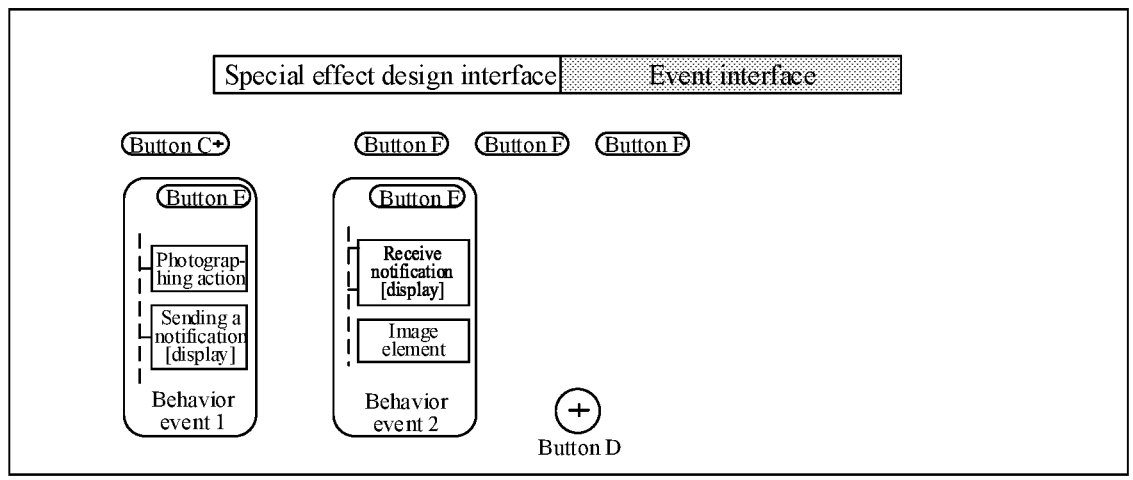

FIG. 8 shows the second way. A photo display event may be independently created. A control instruction issued by a user based on a behavior event creation button is received, and a photo display event is created based on the control instruction. The photo display event is used to display a freeze-frame image. For the manner of creating the photo display event, reference may be made to the manner of creating the photographing behavior event described above. In addition, in order to execute the photo display event after the photographing behavior event, "sending a notification [display]" may be set in the photographing behavior event, and "receiving the notification [display]" may be set in the photo display event, to establish the execution sequence of the above two behavior events.

In some embodiments, when the photographing action occurs, it may be set that while a freeze-frame image is generated based on an original video image, some other image elements are frozen simultaneously with the freeze-frame image. The image elements may be referred to as second image elements. For example, the image elements may include cosmetic, sticker, hair dye, mask and other decorative elements, which may decorative the original video image. In a first case, the second image elements may be image elements that have been displayed at the time when the photographing action is triggered, and the freeze-frame image collected at this time may include at least one of the second image elements, as final image material to be displayed. In a second case, the second image elements may be added to the freeze-frame image after the freeze-frame image is generated based on the original video image, as final image material.

It is not required to re-render the photo material in the image material obtained in the first case, which is adapted to the rendering mode of the existing application for generating special effects. Compared with the second case which requires re-rendering, the first case has high rendering efficiency and reduced rendering pressure.

Figure 9:
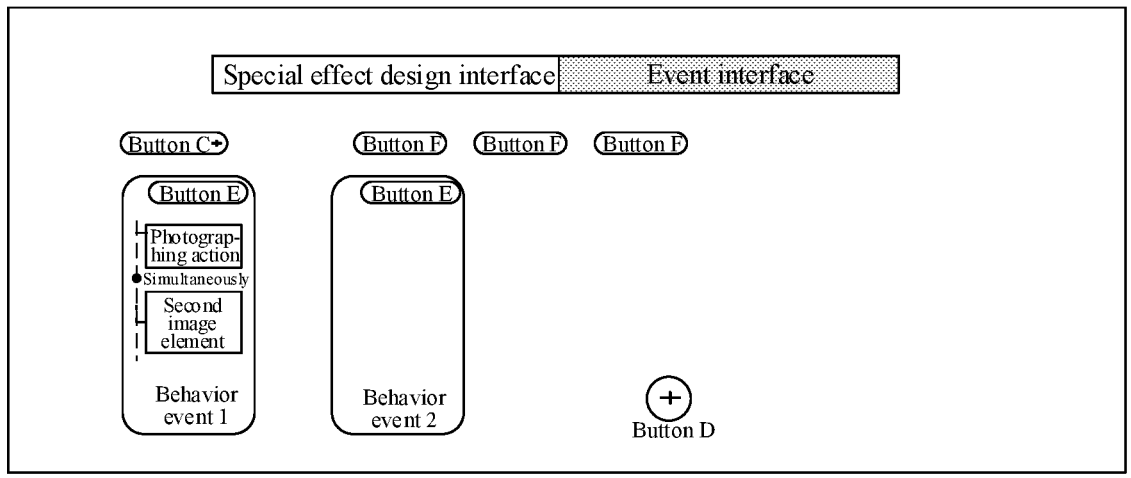

For the first case, there are two processing modes. For example, FIG. 9 shows a first mode. The created photographing behavior event further includes a second display sub-event of displaying at least one second image element. That is, in a process of creating the photographing behavior event, a control instruction issued by a user based on a sub-event creation button on an event interface is received, and a second display sub-event is created in the photographing behavior event based on the control instruction. The second display sub-event is used to display at least one second image element, which may be executed simultaneously as the photographing action is triggered, so that a photo material collected by the photographing action includes a freeze-frame image and at least one second image element.

Figure 10:
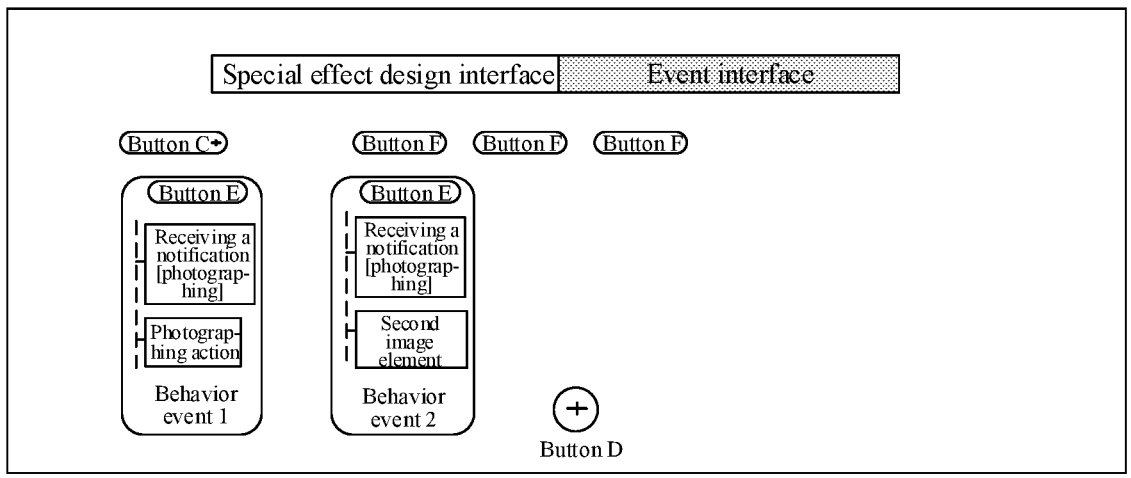

FIG. 10 shows a second processing mode. A control instruction issued by a user based on a behavior event creation button is received, and a first material display event is created based on the control instruction. The first material display event is used to display at least one second image element. The first material display event can be set as being in an execution state as the photographing action is triggered. For example, it may be set that both the first material display event and the photographing behavior event are executed after receiving a certain "receiving a notification [photographing]". Thus, a photo material generated based on an original video image may include at least one second image element.

In some embodiments, for the case of displaying the freeze-frame image according to the embodiments shown in FIG. 7 or 8, the specific display mode may be set. For example, a third image element may be displayed simultaneously. In an embodiment, there are two ways to implement the displaying of the third image element. In a first way, the created photographing behavior event further includes a third display sub-event of displaying at least one third image element. That is, in a process of creating the photographing behavior event, a third display sub-event of displaying at least one third image element is also created, and the third image element may be set to be displayed simultaneously with the freeze-frame image. In a second way, a second material display event is created. That is, a control instruction issued by a user based on a behavior event creation button is received, and a second material display event is created based on the control instruction. The second material display event is used to display at least one third image element, and the third image element is displayed simultaneously with the freeze-frame image.

Figure 11:
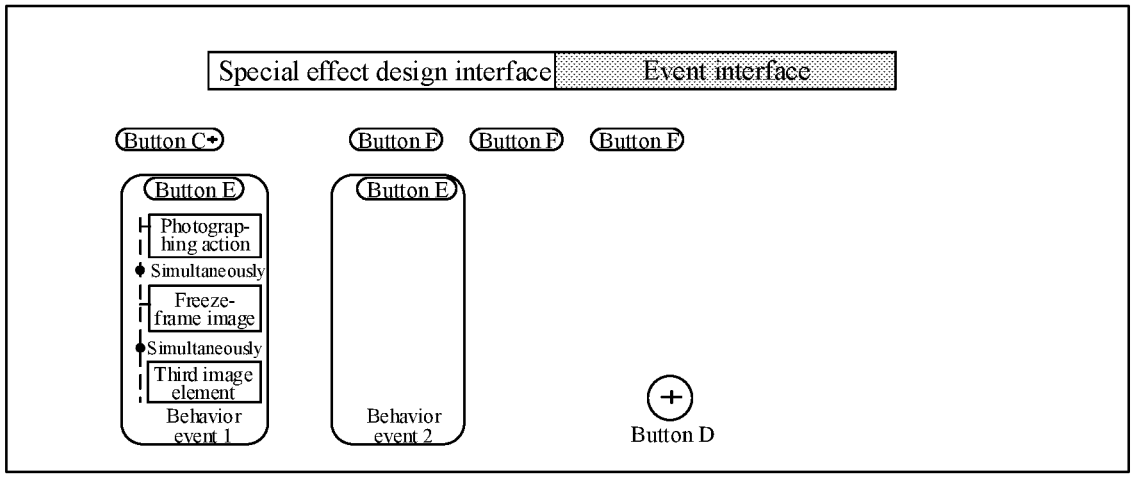

FIG. 11 shows the first way. A control instruction issued by a user based on a sub-event creation button on an event interface may be received, a third display sub-event is created in the photographing behavior event based on the control instruction, and the third display sub-event is set to be displayed simultaneously with the freeze-frame image. The third display sub-event is used to display at least one third image element, and the third image element may be set to be displayed simultaneously with the freeze-frame image. The creation of the third display sub-event is the same as the way of creating the display sub-events of displaying the freeze-frame image and the second image element in the photographing behavior event.

Figure 12:
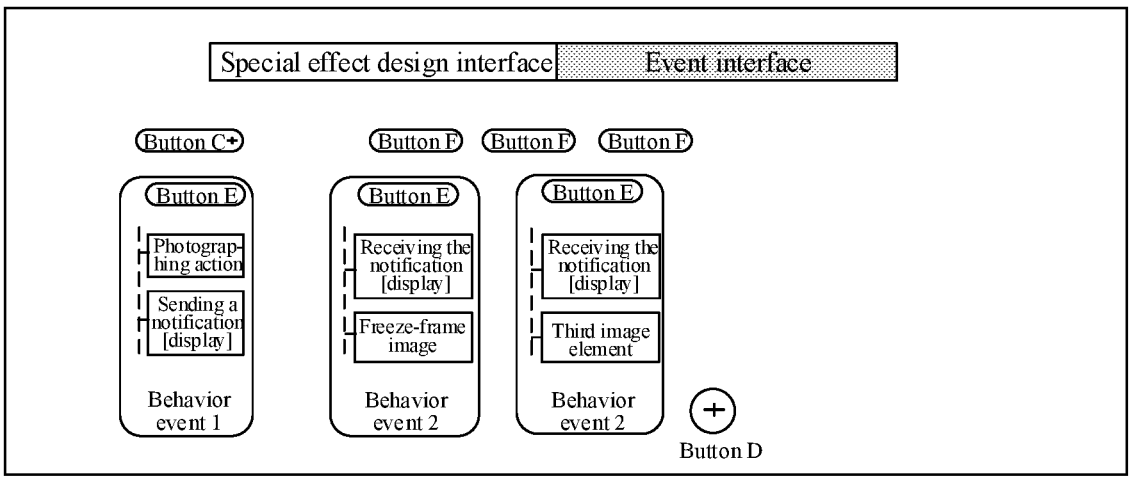

FIG. 12 shows the second way. A second material display event is created. That is, a control instruction issued by a user based on a behavior event creation button is received, a second material display event is created based on the control instruction, and at least one third image element is added to the second material display event, so that at least one third image element may be displayed through the second material display event, and the third image element is displayed simultaneously with the freeze-frame image. For example, the trigger conditions of the displaying of the third image element and the freeze-frame image may be set to be the same, for example, being executed after receiving a same "receiving a notification [display]".

In the embodiments of the present disclosure, a simulated photographing special effect can simulate a photographing scene on a video application, and can display some image elements before the photographing action is triggered. This type of special effect material may be referred to as a first image element, which may also be displayed in two ways. In a first way, a photographing behavior event is set to further include a fourth display sub-event of displaying a first image element, and display time of the first image element is set, by setting in the photographing behavior event, to be prior to the trigger time of the photographing action. In a second way, a third material display event is set independently. That is, a control instruction issued by a user based on a behavior event creation button is received, and a third material display event may be created based on the control instruction. The third material display event is used to display a first image element, and display time of the first image element is prior to the trigger time of the photographing action.

Figure 13:
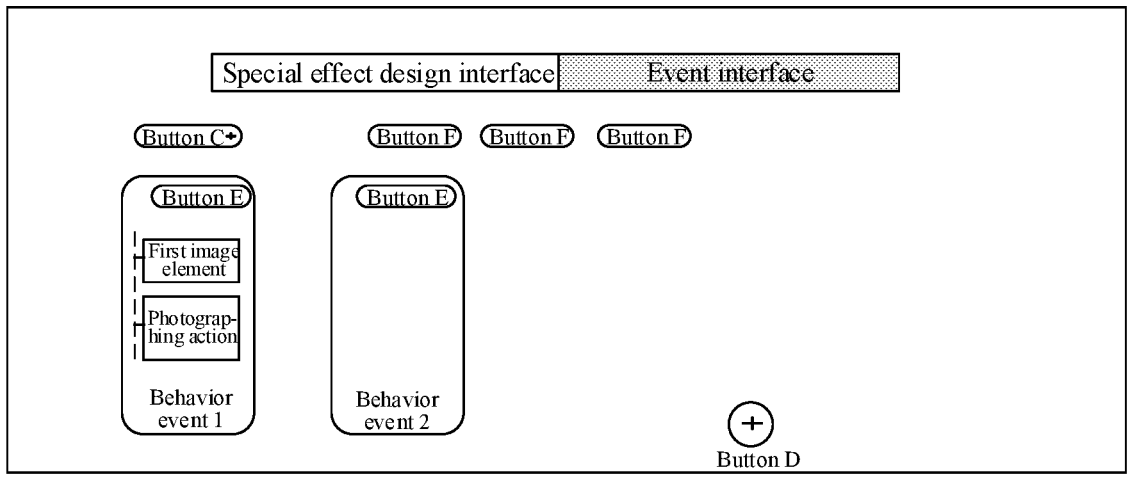

FIG. 13 shows the first way. A control instruction issued by a user based on a sub-event creation button on an event interface is received, and a fourth display sub-event is created in the photographing behavior event based on the control instruction. The fourth display sub-event is used to display a first image element and is set to be displayed before the photographing action. The fourth display sub-event may be created in a manner the same as that of creating the display sub-events of displaying the freeze-frame image, the second image element and the third image in the photographing behavior event.

Figure 14:
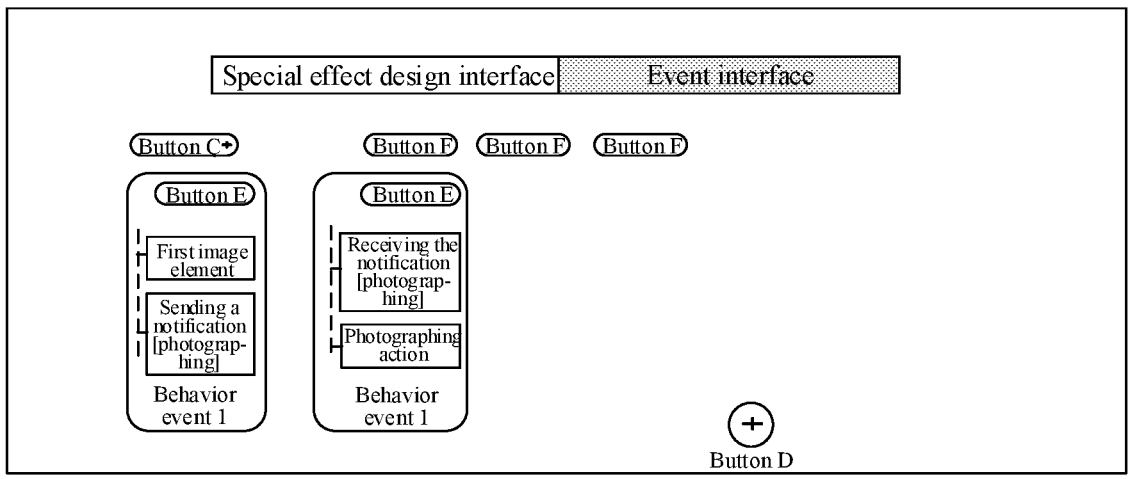

FIG. 14 shows the second way. A third material display event is newly created. That is, a control instruction issued by a user based on a behavior event creation button is received, and a third material display event is created based on the control instruction. The third material display event is used to display a first image element, and display time of the first image element is prior to the trigger time of the photographing action. For example, the end of the third material display event may be set as the trigger condition of the photographing behavior event. The third material display event includes not only the display of the third special effect material, but also "sending a notification [photographing]". The trigger condition of the photographing behavior event is set as "receiving the notification [photographing]". Thus, the first image element is displayed before the photographing action during the execution of the simulated photographing special effect.

In an embodiment, the first image element may include any one of a photographing guide element and/or a photographing scene rendering element. The photographing guide element is used to remind a user that a photographing action is about to be performed. The photographing scene rendering element plays a role in embellishing and rendering the photographing action. For example, the image element may be any one of countdown "3, 2, 1", image blur, flash, background music, clapper, camera frame and other image elements. Through the photographing guide element, the user may be guided to a photographing mode, while through the photographing scene rendering element, a corresponding scene may be rendered based on the actual needs of the user.

In some embodiments, in order to better control the trigger time of the photographing action, a trigger condition of the photographing action may be further set. That is, a trigger sub-event for triggering the photographing action may be created in the photographing behavior event. In an embodiment, a control instruction issued by a user based on a trigger event creation button on an event interface may be received, and a trigger sub-event may be created in the photographing behavior event based on the control instruction.

Figure 15:
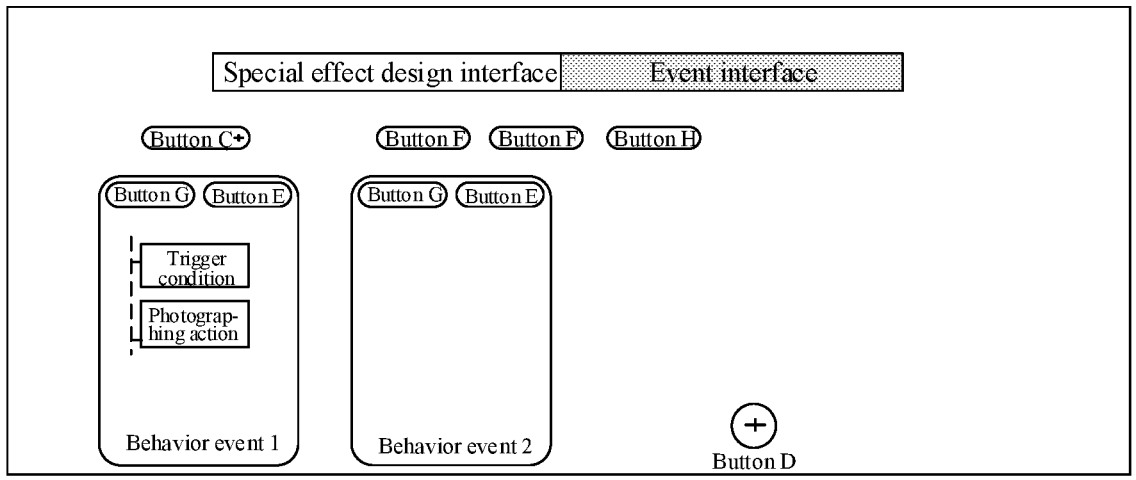

In an embodiment, as shown in FIG. 15, a trigger event creation button may be set on the event interface. The trigger event creation button may be set on various behavior event panels, such as a button G set on a panel for the photographing behavior event. By clicking the button G, a selection list of trigger conditions may be displayed, and a corresponding trigger condition may be selected from the selection list of trigger conditions. Alternatively, a trigger event creation shortcut button, i.e., a button H, may be set, through which a trigger condition may be quickly input, thus creating a trigger sub-event.

In some embodiments, the trigger condition may include at least one of a notification trigger condition, a variable trigger condition, a time trigger condition or a behavior trigger condition, and the trigger sub-event corresponding thereto may be at least one of triggering by receiving a notification, triggering by a variable, triggering by time or triggering by a behavior. The triggering by receiving a notification is the "receiving the notification" as discussed in the forgoing embodiments, which has a wide usage range. A shortcut button for receiving the notification, i.e., a button H, may be set separately. After receiving a preset "receiving the notification", the photographing action is triggered. The triggering by a variable means that the photographing action is triggered once some monitored variables reach a preset value. The triggering by a behavior means that the photographing action is triggered once certain behaviors are detected, such as pouting, finger heart and other behaviors. The triggering by time means that the photographing action is triggered at a certain set time.

In the above embodiments of the present disclosure, the first image element, the second image element and the third image element are used in the process of creating the simulated photographing special effect, and the image elements may be added to the navigation tree of the special effect design interface in advance, i.e., the image elements may be added to the navigation tree of the special effect design interface based on user instructions.

Figure 16:
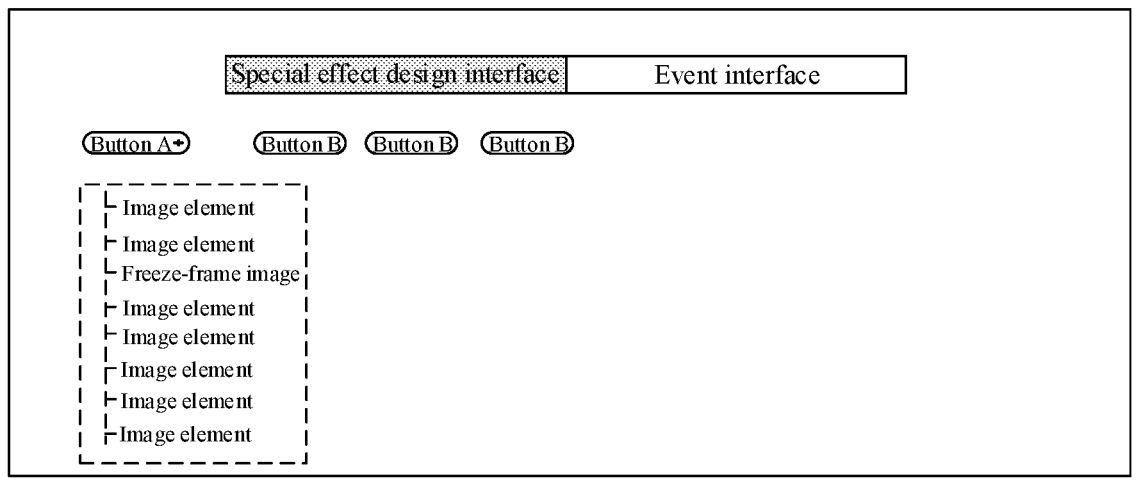
FIG. 16 is a schematic diagram of a special effect design interface according to another embodiment of the present disclosure.

An introduction of a button A as shown in FIG. 16 may be referred to the embodiment shown in FIG. 6. A selection list of elements may be displayed by clicking the button A, and an image element may be selected from the selection list of elements and added to the navigation tree. In a case of creating a behavior event on the event interface, an image element may be selected from the navigation tree. In addition, a button B in the embodiment shown in FIG. 16 may also be used to quickly add the image elements.

In the embodiment shown in FIG. 16, image elements available in the subsequent creation of behavior events are defined in the navigation tree of the special effect design interface. Further, a rendering level of each image element may be reasonably controlled through the navigation tree, so that a problem of mutual occlusion between image elements will not occur during the final display. In the embodiment of the present disclosure, the navigation tree has a function of defining the image rendering chain, i.e., defining rendering levels of the freeze-frame image and the image elements.

Figure 17:
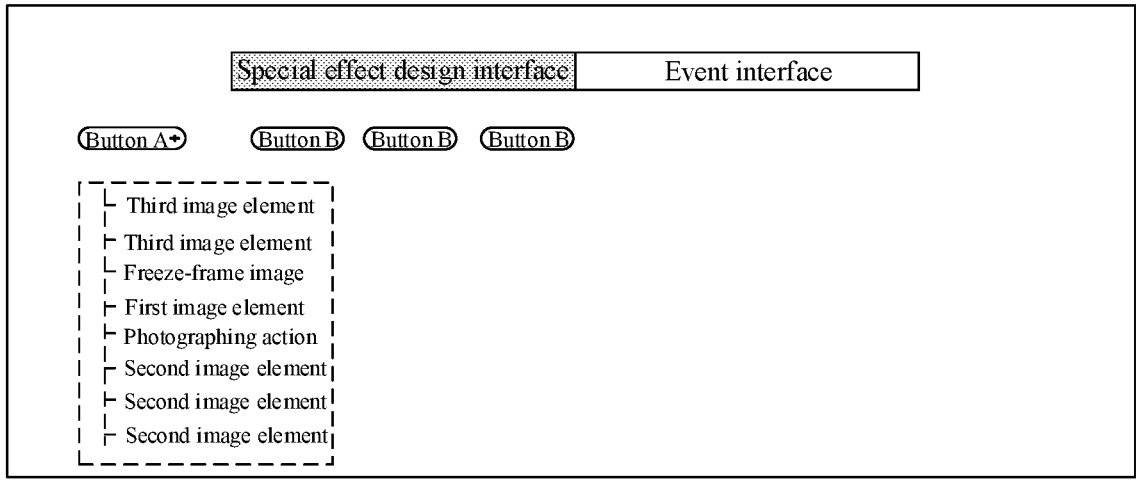
FIG. 17 is a schematic diagram of a special effect design interface according to another embodiment of the present disclosure.

In addition, as shown in FIG. 17, in order to define an image element that is frozen simultaneously with the freeze-frame image, a photographing action may also be added to the navigation tree. The photographing action also corresponds to a rendering level, and an image element after the rendering level of the photographing action may be frozen together with the freeze-frame image. This image element may be the second image element in the above embodiment. However, generally, whether the image element after the rendering level of the photographing action is finally frozen together with the freeze-frame image is determined based on a setting operation on the event interface. For example, a fourth image element associated with the photographing behavior event is determined in response to the user operation for setting the image elements associated with the photographing behavior event. Thus, the finally frozen image element should belong to both the fourth image element and the image element to be rendered after the preset rendering level on the image rendering chain.

In addition, the image elements in the navigation tree may also include the first image element. The first image element belongs to the prior-photographing image element, which is displayed before the forming of the freeze-frame image, but is not frozen with the freeze-frame image. At the same time, the first image element does not belong to the post-photographing image element, and a rendering level corresponding thereto may be before the rendering level of the photographing action while after a rendering level of the freeze-frame image. In this way, the first image element may not be displayed when the freeze-frame image is displayed.

The image elements in the navigation tree may also include the third image element, and a rendering level of the third image element is before the rendering level of the freeze-frame image.

In an embodiment of the present disclosure, a same image element may not only belong to one of the first image element, the second image element and the third image element, but may belong to two of the first image element, the second image element and the third image element based on actual setting situations, and may appear many times during the execution of the special effect.

Figure 18:
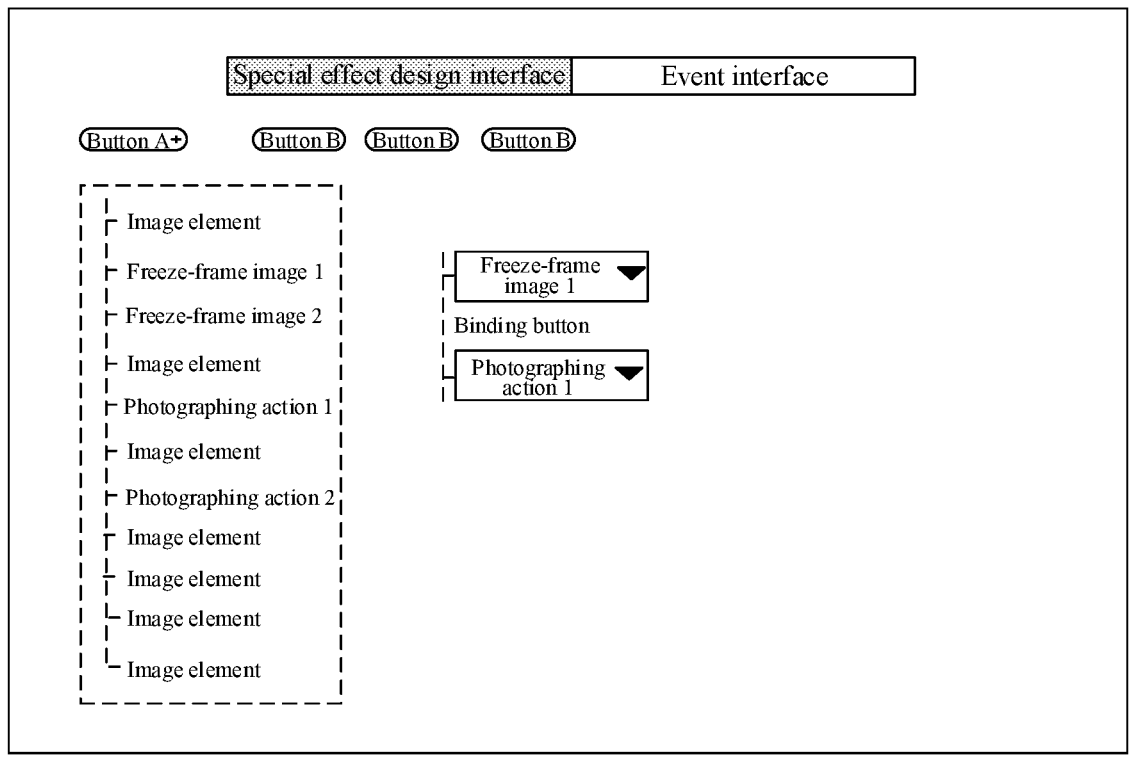
FIG. 18 is a schematic diagram of a special effect design interface according to another embodiment of the present disclosure.

In the above embodiments of the present disclosure, the scene in which there are at least two photographing actions and at least two freeze-frame images is supported. That is, by setting multiple photographing points, multiple photographing actions may be triggered to acquire multiple freeze-frame images, so as to meet the requirements of more scenes. In this case, in order to identify a correspondence between the freeze-frame images and the time points of photographing actions, a binding button may be set on the special effect design interface. In an embodiment, as shown in FIG. 18, two photographing points are included, i.e., a photographing action 1 and a photographing action 2 are included. A freeze-frame image 1 and a freeze-frame image 2 may be obtained through the photographing actions. The user may perform binding operation to receive a correspondence between the photographing actions and the freeze-frame images determined based on the binding button on the special effect design interface. The binding button shown in FIG. 18 is only an example. Other binding ways are also possible.

With the method for generating the simulated photographing special effect according to the embodiments of the present disclosure, the simulated photographing special effect may be generated in the application for generating special effects, thereby significantly improving the generation efficiency of the simulated photographing special effect. In addition, handy means of updating special effect materials may be provided to users of special effects, and switching of different image elements may be achieved by simple operations on some interfaces of the application for generating special effects, to meet the requirements of more application scenes. The application scenes of the simulated photographing special effect according to the embodiments of the present disclosure include but are not limited to application scenes such as a guide-photographing-type special effect, a photographing-tutorial-type special effect, a beauty-type special effect, a scene-prop-type special effect and the like, which fully meet the requirements of the user for various special effects.

In addition, in the embodiments of the present disclosure, the special effect configuration interface further includes a preview window in addition to the items shown in FIGS. 5 to 18. The preview window can show an actual running condition of each behavior event created by the user in real time, so that the user may check the special effects at any time, adjust the behavior events, or re-select and configure image elements without waiting till the simulated photographing special effect is finished, which can significantly improve the production efficiency of special effects.

In the embodiments of the present disclosure, display modes of the freeze-frame images obtained in the photographing behavior event may be set, and the display modes can be diversified to meet the needs of the user for various application scenes. In some embodiments, the setting operation may be performed on the special effect configuration interface such as the event setting interface in the above embodiments.

In some embodiments, the image display mode may include at least one of the following.

A first mode is to perform formatting on the freeze-frame image and then display the freeze-frame image. The specific and reasonable formatting includes but not limited to cropping, scaling, rotating and transparency processing. In an embodiment, the formatting may be implemented by adding a formatting tool in the navigation tree, and a formatting sub-event or a formatting event may be created for the formatting tool.

A second mode is to animate the freeze-frame image and then display the freeze-frame image. In an embodiment, an animation material is generated based on the freeze-frame image, and then the animation material is displayed. In an embodiment, an animation tool and an animation material may be added to the navigation tree, an animation sub-event or an animation event is created for the animation tool, and the animation sub-event or the animation event is executed to obtain the animation material; and an animation material display sub-event or an animation material display event is created for the option of animation material to display the animation material. In addition, the animation tool may produce animation materials based on only the original video image, or may produce animation materials based on the original video image and other simultaneously frozen image elements.

In a third mode, for example, in the embodiment shown in FIG. 18, in a case that there are multiple photographing points and one freeze-frame image is obtained for each photographing point to finally obtain multiple freeze-frame images, the multiple freeze-frame images are displayed in sequence or in a combined manner.

Figure 19:
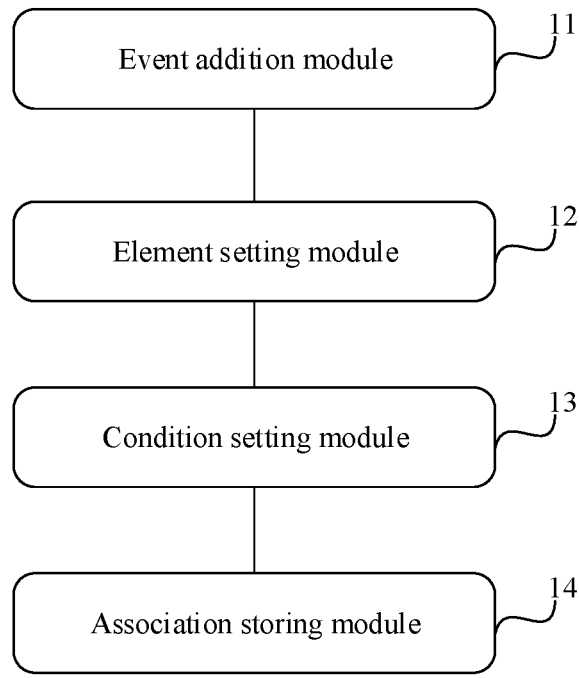
FIG. 19 is a schematic structural diagram of an apparatus for generating a simulated photographing special effect according to an embodiment of the present disclosure.

FIG. 19 is a schematic structural diagram of an apparatus for generating a simulated photographing special effect according to an embodiment of the present disclosure. The apparatus may be implemented as an application for generating special effects, and the application may be integrated in an electronic device. As shown in FIG. 19, the apparatus includes a behavior event addition module 11, an element setting module 12, a condition setting module 13 and an association storing module 14.

The behavior event addition module 11 is configured to add a photographing behavior event in response to a user operation for setting a special effect behavior event.

The element setting module 12 is configured to determine a prior-photographing image element and/or a post-photographing image element associated with the photographing behavior event in response to a user operation for setting image elements associated with the photographing behavior event.

The condition setting module 13 is configured to determine a trigger condition associated with the photographing behavior event in response to a user operation for setting the trigger condition of the photographing behavior event.

The association storing module 14 is configured to store the prior-photographing image element, the post-photographing image element and the trigger condition associated with the photographing behavior event in association in a special effect configuration file.

The special effect configuration file is used in special effect configuration for an original video image during video capturing, so that in the video capturing, a target video image for the output of the video capturing is generated based on the original video image and the prior-photographing image element before the trigger condition of the photographing behavior event is met, and/or the target video image for the output of the video capturing is generated based on a freeze-frame image and the post-photographing image element after the trigger condition of the photographing behavior event is met. The freeze-frame image includes an original video image captured at the instant when the trigger condition of the photographing behavior event is met in the video capturing.

In some embodiments, the prior-photographing image element includes a first image element and a second image element, the post-photographing image element does not include the first image element, and the post-photographing image element includes the second image element.

The post-photographing image element further includes a third image element.

In some embodiments, the apparatus further includes a rendering level setting module.

The rendering level setting module is configured to set an image rendering chain corresponding to the photographing behavior event in response to a user operation for setting rendering levels of the photographing behavior event, and store the image rendering chain in association with the prior-photographing image element, the post-photographing image element and the trigger condition in the special effect configuration file.

The special effect configuration file is further used to determine rendering levels of the prior-photographing image element, the post-photographing image element and the freeze-frame image based on the image rendering chain.

In some embodiments, the element setting module is specifically configured to:
- determine a fourth image element associated with the photographing behavior event in response to the user operation for setting the image elements associated with the photographing behavior event; and determine the post-photographing image element based on the fourth image element and the image element to be rendered after the preset rendering level on the image rendering chain.

The post-photographing image element belongs to both the fourth image element and the image element to be rendered after the freeze-frame image on the image rendering chain.

In some embodiments, the apparatus further includes a photographing point setting module.

The photographing point setting module is configured to set multiple photographing points of the photographing behavior event in response to a user operation for setting a photographing action of the photographing behavior event, and store the multiple photographing points in association with the prior-photographing image element, the post-photographing image element and the trigger condition in the special effect configuration file.

The special effect configuration file is further configured to acquire a freeze-frame image at each of the multiple photographing points, and display the acquired freeze-frame images after the photographing points.

In some embodiments, the apparatus further includes a display mode setting module.

The display mode setting module is configured to set an image display mode of the photographing behavior event in response to a user operation for setting image display of the photographing behavior event, and store the image display mode in association with the prior-photographing image element, the post-photographing image element and the trigger condition in the special effect configuration file.

The special effect configuration file is further configured to display the freeze-frame image based on the display mode.

In some embodiments, the image display mode includes at least one of:
- a mode of formatting the freeze-frame image and then displaying the freeze-frame image;
- a mode of animating the freeze-frame image and then displaying the freeze-frame image; and
- a mode of displaying multiple freeze-frame images in sequence or in a combined manner in case of multiple freeze-frame images.

The apparatus for generating the simulated photographing special effect according to the embodiment of the present disclosure may execute the method for generating the simulated photographing special effect according to any embodiment of the present disclosure, and has corresponding functional modules and beneficial effects for executing the method. For details, reference may be made to the above embodiments shown in FIGS. 1 to 18.

Figure 20:
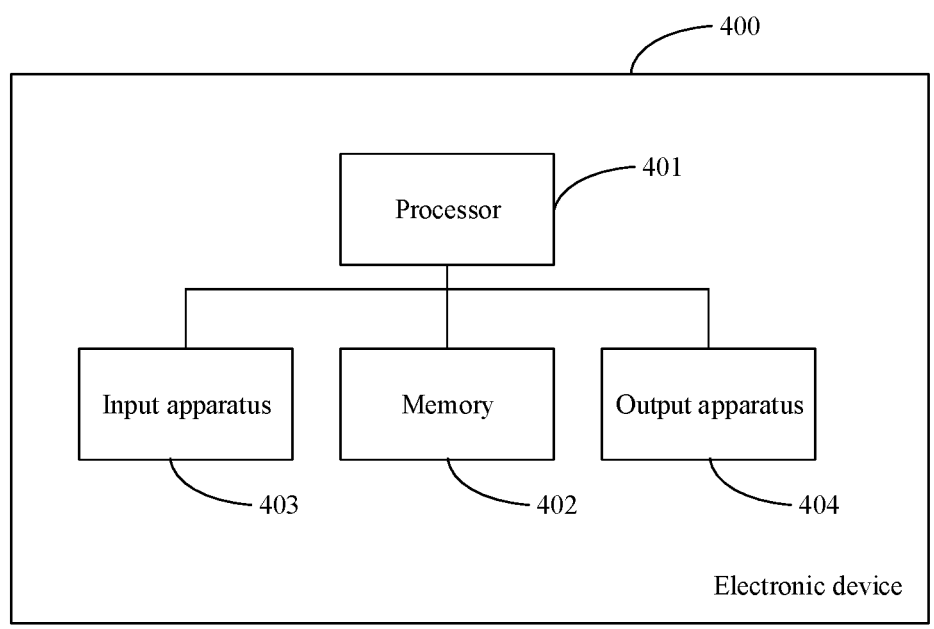
FIG. 20 is a schematic structural diagram of an electronic device according to an embodiment of the present disclosure.

FIG. 20 is a schematic structural diagram of an electronic device according to an embodiment of the present disclosure. As shown in FIG. 20, the electronic device 400 includes one or more processors 401 and a memory 402.

The processor 401 may be a central processing unit (CPU) or other forms of processing units with data processing capability and/or instruction execution capability, and may control other components in the electronic device 400 to perform desired functions.

The memory 402 may include one or more computer program products, which may include various forms of computer readable storage media, such as a volatile memory and/or a nonvolatile memory. The volatile memory may include, for example, a random access memory (RAM) and/or a cache. The nonvolatile memory may include, for example, a read-only memory (ROM), a hard disk and a flash memory. One or more computer program instructions may be stored on the computer readable storage medium, and the processor 401 may execute the program instructions to implement the method for generating the simulated photographing special effect and/or other desired functions according to the embodiments of the present disclosure described above. Various contents such as input signals, signal components and noise components may also be stored in the computer readable storage medium.

In one example, the electronic device 400 may further include an input apparatus 403 and an output apparatus 404, which are interconnected by a bus system and/or other forms of connection mechanisms (not shown).

In addition, the input apparatus 403 may also include, for example, a keyboard and a mouse.

The output apparatus 404 may output various information to the outside, including the determined distance information, direction information and the like. The output apparatus 404 may include, for example, a display, a speaker, a printer, a communication network and a remote output device connected thereto.

Of course, for simplicity, only some components related to the present disclosure in the electronic device 400 are shown in FIG. 20 and components such as a bus and an input/output interface are omitted. Besides, according to the specific application, the electronic device 400 may also include any other suitable components.

In addition to the above method and device, a computer program product may be further provided according to an embodiment of the present disclosure, which includes computer program instructions that, when executed by a processor, cause the processor to execute the method for generating the simulated photographing special effect according to the embodiments of the present disclosure.

In the computer program product, the program code for performing the operations in the embodiments of the present disclosure may be written in any combination of one or more programming languages. The programming languages include an object-oriented programming language, such as Java and C++, and a conventional procedural programming language, such as C language or a similar programming language. The program code may be executed entirely on a user computing device, partially on the user device, as an standalone software package, partially on the user computing device and partially on a remote computing device, or entirely on the remote computing device or a server.

In addition, a computer readable storage medium storing computer program instructions may be further provided according to an embodiment of the present disclosure. The computer program instructions, when executed by a processor, cause the processor to execute the method for generating the simulated photographing special effect according to the embodiments of the present disclosure.

The computer readable storage medium may adopt any combination of one or more readable media. The readable medium may be a readable signal medium or a readable storage medium. The readable storage medium may include, but not limited to, a system, an apparatus, or a device in an electronic, magnetic, optical, electromagnetic, infrared, or semi-conductive form, or any combination thereof. The readable storage medium, for example (a non-exhaustive list), includes an electrical connection with one or more wires, a portable disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

It should be noted that in the present disclosure, relational terms such as "first" and "second" are only used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, an element defined by a statement of "including one . . . " does not exclude a case that other similar elements exist in the process, method, article or device including the element.

The above are only specific implementations of the present disclosure, so that those skilled in the art can understand or implement the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A method for generating a simulated photographing special effect, comprising:
   adding a photographing behavior event in response to a user operation for setting a special effect behavior event;
   determining a prior-photographing image element and a post-photographing image element associated with the photographing behavior event in response to a user operation for setting image elements associated with the photographing behavior event;
   determining a trigger condition associated with the photographing behavior event in response to a user operation for setting the trigger condition of the photographing behavior event; and
   storing the prior-photographing image element, the post-photographing image element and the trigger condition associated with the photographing behavior event in association in a special effect configuration file;
   wherein the special effect configuration file is used in special effect configuration for an original video image in video capturing, so that in the video capturing, a target video image for output of the video capturing is generated based on the original video image and the prior-photographing image element before the trigger condition of the photographing behavior event is met, and the target video image for the output of the video capturing is generated based on a freeze-frame image and the post-photographing image element after the trigger condition of the photographing behavior event is met, wherein the freeze-frame image is an original video image captured at an instant when the trigger condition of the photographing behavior event is met during the video capturing.

2. The method according to claim 1, wherein the prior-photographing image element comprises a first image element and a second image element, the post-photographing image element does not comprise the first image element, and the post-photographing image element comprises the second image element.

3. The method according to claim 2, wherein the post-photographing image element further comprises a third image element.

4. The method according to claim 1, further comprising:
   setting an image rendering chain corresponding to the photographing behavior event in response to a user operation for setting rendering levels of the photographing behavior event, and storing the image rendering chain in association with the prior-photographing image element, the post-photographing image element and the trigger condition in the special effect configuration file;
   wherein the special effect configuration file is further used to determine rendering levels of the prior-photographing image element, the post-photographing image element and the freeze-frame image based on the image rendering chain during the video capturing.

5. The method according to claim 4, further comprising:
   setting an image element to be rendered after a preset rendering level on the image rendering chain in response to the user operation for setting the rendering levels of the photographing behavior event, wherein the image element to be rendered after the preset rendering level is an image element that is capable of being frozen simultaneously with the freeze-frame image.

6. The method according to claim 4, wherein the determining the post-photographing image element associated with the photographing behavior event in response to the user operation for setting image elements associated with the photographing behavior event comprises:
   determining a fourth image element associated with the photographing behavior event in response to the user operation for setting the image elements associated with the photographing behavior event; and
   determining the post-photographing image element based on the fourth image element and the image element to be rendered after the preset rendering level on the image rendering chain;
   wherein the post-photographing image element belongs to both the fourth image element and the image element to be rendered after the preset rendering level on the image rendering chain.

7. The method according to claim 1, further comprising:
   setting a plurality of photographing points of the photographing behavior event in response to a user operation for setting a photographing action of the photographing behavior event, and storing the plurality of photographing points in association with the prior-photographing image element, the post-photographing image element and the trigger condition in the special effect configuration file;
   wherein the special effect configuration file is further used to acquire one freeze-frame image at each of the plurality of photographing points, and display the acquired freeze-frame images after the photographing points.

8. The method according to claim 1, further comprising:
setting an image display mode of the photographing behavior event in response to a user operation for setting image display of the photographing behavior event, and storing the image display mode in association with the prior-photographing image element, the post-photographing image element and the trigger condition in the special effect configuration file;
wherein the special effect configuration file is further used to display the freeze-frame image based on the image display mode.

9. The method according to claim 8, wherein the image display mode comprises at least one of:
a mode of formatting the freeze-frame image and then displaying the freeze-frame image;
a mode of animating the freeze-frame image and then displaying the freeze-frame image; and
a mode of displaying freeze-frame images in sequence or in a combined manner in case of multiple freeze-frame images.

10. An electronic device, comprising:
a processor; and
a memory configured to store processor-executable instructions;
wherein the processor is configured to read the executable instructions from the memory and execute the instructions to implement:
adding a photographing behavior event in response to a user operation for setting a special effect behavior event;
determining a prior-photographing image element and a post-photographing image element associated with the photographing behavior event in response to a user operation for setting image elements associated with the photographing behavior event;
determining a trigger condition associated with the photographing behavior event in response to a user operation for setting the trigger condition of the photographing behavior event; and
storing the prior-photographing image element, the post-photographing image element and the trigger condition associated with the photographing behavior event in association in a special effect configuration file;
wherein the special effect configuration file is used in special effect configuration for an original video image in video capturing, so that in the video capturing, a target video image for output of the video capturing is generated based on the original video image and the prior-photographing image element before the trigger condition of the photographing behavior event is met, and the target video image for the output of the video capturing is generated based on a freeze-frame image and the post-photographing image element after the trigger condition of the photographing behavior event is met, wherein the freeze-frame image is an original video image captured at an instant when the trigger condition of the photographing behavior event is met during the video capturing.

11. The electronic device according to claim 10, wherein the prior-photographing image element comprises a first image element and a second image element, the post-photographing image element does not comprise the first image element, and the post-photographing image element comprises the second image element.

12. The electronic device according to claim 11, wherein the post-photographing image element further comprises a third image element.

13. The electronic device according to claim 10, wherein the processor is further configured to implement:
setting an image rendering chain corresponding to the photographing behavior event in response to a user operation for setting rendering levels of the photographing behavior event, and storing the image rendering chain in association with the prior-photographing image element, the post-photographing image element and the trigger condition in the special effect configuration file;
wherein the special effect configuration file is further used to determine rendering levels of the prior-photographing image element, the post-photographing image element and the freeze-frame image based on the image rendering chain during the video capturing.

14. The electronic device according to claim 13, wherein the processor is further configured to implement:
setting an image element to be rendered after a preset rendering level on the image rendering chain in response to the user operation for setting the rendering levels of the photographing behavior event, wherein the image element to be rendered after the preset rendering level is an image element that is capable of being frozen simultaneously with the freeze-frame image.

15. The electronic device according to claim 13, wherein the processor is further configured to implement:
determining a fourth image element associated with the photographing behavior event in response to the user operation for setting the image elements associated with the photographing behavior event; and
determining the post-photographing image element based on the fourth image element and the image element to be rendered after the preset rendering level on the image rendering chain;
wherein the post-photographing image element belongs to both the fourth image element and the image element to be rendered after the preset rendering level on the image rendering chain.

16. The electronic device according to claim 10, wherein the processor is further configured to implement:
setting a plurality of photographing points of the photographing behavior event in response to a user operation for setting a photographing action of the photographing behavior event, and storing the plurality of photographing points in association with the prior-photographing image element, the post-photographing image element and the trigger condition in the special effect configuration file;
wherein the special effect configuration file is further used to acquire one freeze-frame image at each of the plurality of photographing points, and display the acquired freeze-frame images after the photographing points.

17. The electronic device according to claim 10, wherein the processor is further configured to implement:
setting an image display mode of the photographing behavior event in response to a user operation for setting image display of the photographing behavior event, and storing the image display mode in association with the prior-photographing image element, the post-photographing image element and the trigger condition in the special effect configuration file;
wherein the special effect configuration file is further used to display the freeze-frame image based on the image display mode.

18. The electronic device according to claim 17, wherein the image display mode comprises at least one of:
- a mode of formatting the freeze-frame image and then displaying the freeze-frame image;
- a mode of animating the freeze-frame image and then displaying the freeze-frame image; and
- a mode of displaying freeze-frame images in sequence or in a combined manner in case of multiple freeze-frame images.

19. A non-transitory computer readable storage medium having a computer program stored thereon, wherein the computer program is configured to implement:
- adding a photographing behavior event in response to a user operation for setting a special effect behavior event;
- determining a prior-photographing image element and a post-photographing image element associated with the photographing behavior event in response to a user operation for setting image elements associated with the photographing behavior event;
- determining a trigger condition associated with the photographing behavior event in response to a user operation for setting the trigger condition of the photographing behavior event; and
- storing the prior-photographing image element, the post-photographing image element and the trigger condition associated with the photographing behavior event in association in a special effect configuration file;
- wherein the special effect configuration file is used in special effect configuration for an original video image in video capturing, so that in the video capturing, a target video image for output of the video capturing is generated based on the original video image and the prior-photographing image element before the trigger condition of the photographing behavior event is met, and the target video image for the output of the video capturing is generated based on a freeze-frame image and the post-photographing image element after the trigger condition of the photographing behavior event is met, wherein the freeze-frame image is an original video image captured at an instant when the trigger condition of the photographing behavior event is met during the video capturing.

* * * * *